United States Patent
Zhang

(10) Patent No.: US 12,506,562 B2
(45) Date of Patent: Dec. 23, 2025

(54) METHOD AND DEVICE FOR RELAY TRANSMISSION

(71) Applicant: BUNKER HILL TECHNOLOGIES LLC, Allen, TX (US)

(72) Inventor: Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 414 days.

(21) Appl. No.: 18/099,248

(22) Filed: Jan. 19, 2023

(65) Prior Publication Data
US 2023/0155738 A1    May 18, 2023

Related U.S. Application Data

(63) Continuation of application No. PCT/CN2021/114673, filed on Aug. 26, 2021.

(30) Foreign Application Priority Data

Aug. 28, 2020 (CN) .......................... 202010887198.5
Sep. 2, 2020 (CN) .......................... 202010909038.6

(51) Int. Cl.
| H04L 1/1812 | (2023.01) |
| H04W 76/28 | (2018.01) |
| H04W 92/10 | (2009.01) |

(52) U.S. Cl.
CPC ........... *H04L 1/1812* (2013.01); *H04W 76/28* (2018.02); *H04W 92/10* (2013.01)

(58) Field of Classification Search
CPC ... H04W 72/21; H04W 72/23; H04W 72/231; H04W 72/232; H04W 72/1263;

(Continued)

(56) References Cited

U.S. PATENT DOCUMENTS

2010/0144299 A1   6/2010   Ren
2014/0078944 A1   3/2014   Yang et al.

(Continued)

FOREIGN PATENT DOCUMENTS

WO   2020076027 A1   4/2020
WO   2020159134 A1   8/2020

OTHER PUBLICATIONS

First Office Action dated Dec. 30, 2024, from The State Intellectual Property Office of People's Republic of China, for CN Application No. 20201909038.6, English translation, 17 pgs.

(Continued)

*Primary Examiner* — Peter Chen
(74) *Attorney, Agent, or Firm* — Ascenda Law Group, PC

(57) ABSTRACT

A first node transmits a first physical-layer signaling and a first Medium Access Control (MAC) Protocol Data Unit (PDU) via an air interface. The first MAC PDU comprises a first MAC header and a first MAC Service Data Unit (SDU). The first node monitors a first Hybrid Automatic Repeat reQuest Acknowledgment (HARQ-ACK) on each channel in a first channel set, and the first HARQ-ACK indicates whether the first MAC PDU is correctly decoded. The first physical-layer signaling comprises scheduling information of the first MAC PDU. The first channel set comprises Q channel(s), Q being a non-negative integer. The condition of whether a number of continuous HARQ DTXs reaches a first threshold is used to determine Q. The first MAC SDU is transmitted through a first radio bearer, and the first radio bearer is unrelated to whether the number of the continuous HARQ DTXs reaches the first threshold.

18 Claims, 5 Drawing Sheets

(58) Field of Classification Search
CPC ......... H04W 72/1268; H04W 72/1273; H04W 76/28; H04W 92/10; H04W 52/146; H04L 5/0053; H04L 5/0055; H04L 5/0057; H04L 1/1812; H04L 1/1864; H04L 1/1896; H04L 2001/0097
See application file for complete search history.

(56) References Cited

U.S. PATENT DOCUMENTS

| | | |
|---|---|---|
| 2014/0362755 A1 | 12/2014 | Yu |
| 2020/0146046 A1 | 5/2020 | Agiwal |
| 2020/0281011 A1 | 9/2020 | Xiong et al. |
| 2022/0022094 A1* | 1/2022 | Lee ..................... H04L 1/1822 |

OTHER PUBLICATIONS

ISR received in application No. PCT/CN2021/114673 dated Nov. 17, 2021.
Second Office Action dated Jun. 14, 2025, from China National Intellectual Property Administration, for CN Application No. 20201909038.6, 15 pgs.

* cited by examiner

METHOD AND DEVICE FOR RELAY TRANSMISSION

CROSS REFERENCE TO RELATED APPLICATIONS

This application is the a continuation of the International patent application PCT/CN2021/114673, filed on Aug. 26, 2021, which claims the priority benefit of Chinese Patent Application CN202010909038.6, filed on Sep. 2, 2020, and claims the priority of Chinese Patent Application CN202010887198.5, filed on Aug. 28, 2020, the full disclosure of which is incorporated herein by reference.

BACKGROUND

Technical Field

The present disclosure relates to methods and devices in wireless communication systems, and in particular to a scheme and a device supporting relay transmission in wireless communication systems.

RELATED ART

Relay communication is a common method in cellular network communications. Data of a source node is forwarded by a relay node to a remote node. The source node and the remote node are usually a base station and a User Equipment (UE), or both may be UEs; the relay node may be a network device or a UE. Common relay communications comprise a layer 1 relay and a layer 2 relay, an information bit recovered at a physical layer is forwarded by the former relay node, and an information bit recovered at layer 2 is forwarded by the latter relay node.

As a significant application scenario of cellular communications, Device to Device (D2D) or Vehicle to everything (V2X) helps realize direct communications between two communication terminals. In 3rd Generation Partner Project (3GPP) 4G and 5G standard, D2D/V2X are both introduced.

SUMMARY

The inventors have found through researches that if a source node can realize a reliable data transmission with a remote node through a relay node, and a BLock Error Rate (BLER) of a signaling is usually far lower than a BLER of data, a direct link between the source node and the remote node can usually carry out a signaling transmission with a higher BLER. The inventors have found through researches that: using the direct link between the source node and the remote node may reduce the data retransmission operations of the source node, thus significantly improving transmission efficiency.

To address the above problem, the present disclosure provides a solution. It should be noted that although in some embodiments of the present disclosure, the source node, the relay node and the remote node are all UEs; the present disclosure is also applicable to relay transmissions facing similar problems where the network device is involved, for example, the source node is a base station, or the relay node is a base station, or the remote node is a base station, so as to achieve similar technical effects. Additionally, the adoption of a unified solution for various scenarios, including but not limited to V2X, uplink communications and downlink communications, contributes to the reduction of hardcore complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
- transmitting a first physical-layer signaling and a first Media Access Control (MAC) Protocol Data Unit (PDU) via an air interface, the first MAC PDU comprising a first MAC header and a first MAC service Data Unit (SDU); and
- monitoring a first Hybrid Automatic Repeat reQuest (HARQ)-ACK on each channel in a first channel set, the first HARQ-ACK indicating whether the first MAC PDU is correctly decoded;
- herein, the first physical-layer signaling comprises scheduling information of the first MAC PDU; the first channel set comprises Q channel(s), Q being a non-negative integer; whether a number of continuous HARQ Discontinuous Transmissions (DTXs) reaches a first threshold is used to determine Q; the first MAC SDU is transmitted through a first radio bearer, and the first radio bearer is unrelated to whether the number of the continuous HARQ DTXs reaches the first threshold.

In one embodiment, the first node judges whether a target link fails according to the number of the continuous HARQ DTXs on the target link in the above method, so as to judge whether it is necessary to continue monitoring an HARQ-ACK on the target link; therefore, whether data is retransmitted can be more accurately judged.

Specifically, according to one aspect of the present disclosure, the above method is characterized in that whether the number of the continuous HARQ DTXs reaches the first threshold is used to determine a first field in the first MAC header and a second field in the first physical-layer signaling, and the first field in the first MAC header and the second field in the first physical-layer signaling indicate a destination of the first MAC PDU.

In one embodiment, the above method implicitly indicates whether the number of the continuous HARQ DTXs reaches the first threshold, thus avoiding redundant overhead brought by signaling configuration.

In one embodiment, the above method can realize quick handover of the Q value according to whether the number of the continuous HARQ DTXs reaches the first threshold, and further adjust strategy of data retransmission in time.

Specifically, according to one aspect of the present disclosure, the above method is characterized in comprising:
- when the number of the continuous HARQ DTXs reaches the first threshold, transmitting a second message via an air interface;
- herein, the second message is used to determine that the first channel set does not comprise a first channel.

In one embodiment, the above method allows a relay node and a remote node to reuse a destination identity (ID), which avoids a design of a special redundant signaling in order to let a relay node distinguish between data for its own or data that needs to be forwarded by itself.

Specifically, according to one aspect of the present disclosure, the above method is characterized in that when the number of the continuous HARQ DTXs reaches the first threshold, Q is Q1; and when the number of the continuous HARQ DTXs does not reach the first threshold, Q is Q2; Q1 is not greater than a difference value obtained by subtracting 1 from Q2.

In one embodiment, Q1 and Q2 are respectively 1 and 2.

Specifically, according to one aspect of the present disclosure, the above method is characterized in comprising:

after time-domain resources occupied by the first channel set, receiving a second MAC PDU via an air interface, the second MAC PDU comprising a second MAC header and a second MAC SDU;

transmitting a third MAC PDU via an air interface, the third MAC PDU comprising a third MAC header and a third MAC SDU; and monitoring a second HARQ-ACK on each channel in a second channel set, the second HARQ-ACK indicating whether a third MAC PDU is correctly decoded;

herein, the number of the continuous HARQ DTXs reaches the first threshold; the second MAC PDU is used to determine that Q2 channel(s) is(are) comprised in the second channel set, and the third MAC PDU is transmitted through the first radio bearer.

In one embodiment, the above aspect enables the first node to recover a number of channel(s) in the second channel set from Q1 to Q2 when target link quality improves, thus improving transmission efficiency.

Specifically, according to one aspect of the present disclosure, the above method is characterized in comprising:

when an ACK for the first MAC PDU is detected on any channel in the first channel set, dropping retransmitting the first MAC PDU via an air interface; when no ACK for the first MAC PDU is detected on all channels in the first channel set, retransmitting the first MAC PDU via an air interface;

herein, the number of the continuous HARQ DTXs does not reach the first threshold, Q is greater than 1, and at least one of the Q channels is reserved for a communication node other than a target receiver of the first MAC PDU to transmit the first HARQ-ACK.

In one embodiment, the above method can significantly reduce data retransmission of the first node, so as to improve spectrum utilization efficiency.

Specifically, according to one aspect of the present disclosure, the above method is characterized in comprising:

receiving a fifth MAC PDU via an air interface, the fifth MAC PDU comprising a first RLC PDU; when the first RLC PDU indicates that the RLC SDU carried by the first MAC SDU reaches a maximum number of retransmissions, releasing the first radio bearer;

herein, the first RLC PDU indicates whether an RLC SDU carried by the first MAC SDU is received.

The present disclosure provides a method in a second node for wireless communications, comprising:

receiving a first physical-layer signaling via an air interface, detecting a first MAC PDU via an air interface, the first MAC PDU comprising a first MAC header and a first MAC SDU; and transmitting a first HARQ-ACK on a first channel in a first channel set, or, dropping transmitting a first HARQ-ACK;

herein, the first channel set comprises Q channel(s), Q being a non-negative integer; whether the first HARQ-ACK is transmitted is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

Specifically, according to one aspect of the present disclosure, the above method is characterized in comprising:

receiving a second message via an air interface;

herein, the second message is used to determine that the first channel set does not comprise the first channel, as a response to the number of the continuous HARQ DTXs reaching the first threshold, the second message is triggered; as a response to receiving the second message, the behavior of dropping transmitting a first HARQ-ACK is performed.

Specifically, according to one aspect of the present disclosure, the above method is characterized in that when the number of the continuous HARQ DTXs reaches the first threshold, Q is Q1; when the number of the continuous HARQ DTXs does not reach the first threshold, Q is Q2; Q1 is not greater than a difference value obtained by subtracting 1 from Q2.

Specifically, according to one aspect of the present disclosure, the above method is characterized in comprising:

after time-domain resources occupied by the first channel set, transmitting a second MAC PDU via an air interface, the second MAC PDU comprising a second MAC header and a second MAC SDU;

receiving a third MAC PDU via an air interface, the third MAC PDU comprising a third MAC header and a third MAC SDU; and transmitting a second HARQ-ACK on a channel in a second channel set, the second HARQ-ACK indicating whether a third MAC PDU is correctly decoded;

herein, the number of the continuous HARQ DTXs reaches the first threshold; the second MAC PDU is used to determine that Q2 channel(s) is(are) comprised in the second channel set, and the third MAC PDU is transmitted through the first radio bearer.

Specifically, according to one aspect of the present disclosure, the above method is characterized in comprising:

receiving a fourth MAC PDU via an air interface, the fourth MAC PDU comprising a fourth MAC header and the first MAC SDU;

herein, the number of the continuous HARQ DTXs does not reach the first threshold, Q is greater than 1, and at least one of the Q channels is reserved for a transmitter of the fourth MAC PDU to transmit the first HARQ-ACK; the second node is a target receiver of the first MAC PDU, and the transmitter of the fourth MAC PDU is not a target receiver of the first MAC PDU; the transmitter of the fourth MAC PDU transmits a first HARQ-ACK in the first channel set, and the first HARQ-ACK indicates that the first MAC PDU is correctly decoded.

Specifically, according to one aspect of the present disclosure, the above method is characterized in comprising:

transmitting a fifth MAC PDU via an air interface, the fifth MAC PDU comprising a first RLC PDU;

herein, the first RLC PDU indicates whether an RLC SDU carried by the first MAC SDU is received.

The present disclosure provides a method in a third node for wireless communications, comprising:

receiving a first physical-layer signaling via an air interface, detecting a first MAC PDU via an air interface, the first MAC PDU comprising a first MAC header and a first MAC SDU;

monitoring a first HARQ-ACK on a first channel in a first channel set; or, dropping monitoring a first HARQ-ACK; and transmitting a first HARQ-ACK on a channel in a first channel set;

herein, the first channel set comprises Q channel(s), Q being a non-negative integer; whether the first HARQ-ACK is monitored is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

Specifically, according to one aspect of the present disclosure, the above method is characterized in that at least the former of a second field in the first physical-layer signaling and a first field in the first MAC header is used to determine whether the number of the continuous HARQ DTXs reaches the first threshold, and the first field in the first MAC header and the second field in the first physical-layer signaling indicate a destination of the first MAC PDU.

Specifically, according to one aspect of the present disclosure, the above method is characterized in comprising:

receiving a second message via an air interface;

herein, the second message is used to determine that the first channel set does not comprise a first channel, as a response to the number of the continuous HARQ DTXs reaching the first threshold, the second message is triggered;

Specifically, according to one aspect of the present disclosure, the above method is characterized in that when the number of the continuous HARQ DTXs reaches the first threshold, Q is Q1; when the number of the continuous HARQ DTXs does not reach the first threshold, Q is Q2; Q1 is not greater than a difference value obtained by subtracting 1 from Q2.

Specifically, according to one aspect of the present disclosure, the above method is characterized in that the number of the continuous HARQ DTXs does not reach the first threshold, the third node monitors the first HARQ-ACK on the first channel in the first channel set and the detected first HARQ-ACK is an ACK; whether the third node correctly decodes the first MAC PDU, the first HARQ-ACK transmitted by the third node on the channel in the first channel set is an ACK.

Specifically, according to one aspect of the present disclosure, the above method is characterized in comprising:

transmitting a fourth MAC PDU via an air interface, the fourth MAC PDU comprising a fourth MAC header and the first MAC SDU;

herein, the number of the continuous HARQ DTXs does not reach the first threshold, Q is greater than 1; the third node is not a target receiver of the first MAC PDU; and the third node transmits the first HARQ-ACK on the channel in the first channel set.

The present disclosure provides a first node for wireless communications, comprising:

a first transmitter, transmitting a first physical-layer signaling and a first MAC PDU via an air interface, the first MAC PDU comprising a first MAC header and a first MAC SDU; and a first receiver, monitoring a first HARQ-ACK on each channel in a first channel set, the first HARQ-ACK indicating whether the first MAC PDU is correctly decoded;

herein, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

The present disclosure provides a second node for wireless communications, comprising:

a second receiver, receiving a first physical-layer signaling via an air interface, detecting a first MAC PDU via an air interface, the first MAC PDU comprising a first MAC header and a first MAC SDU; and a second transmitter, transmitting a first HARQ-ACK on a channel in a first channel set, or, dropping transmitting a first HARQ-ACK;

herein, the first channel set comprises Q channel(s), Q being a non-negative integer; whether the first HARQ-ACK is transmitted is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

The present disclosure provides a third node for wireless communications, comprising:

a third receiver, receiving a first physical-layer signaling via an air interface, detecting a first MAC PDU via an air interface, the first MAC PDU comprising a first MAC header and a first MAC SDU; monitoring a first HARQ-ACK on a first channel in a first channel set; or, dropping monitoring a first HARQ-ACK; and a third transmitter, transmitting a first HARQ-ACK on a channel in a first channel set;

herein, the first channel set comprises Q channel(s), Q being a non-negative integer; whether the first HARQ-ACK is monitored is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
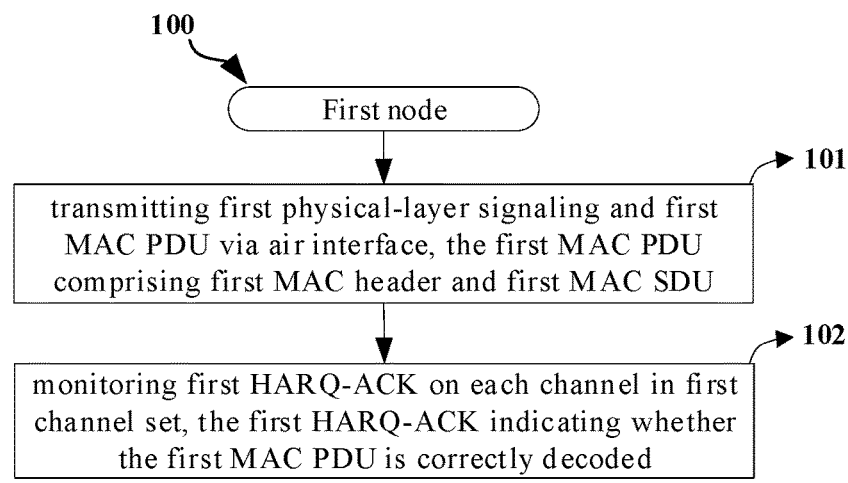
FIG. 1 illustrates a flowchart of transmission of a first node according to one embodiment of the present disclosure.

Embodiment 1 illustrates a flowchart of transmission of a first node according to one embodiment of the present disclosure, as shown in FIG. 1.

In embodiment 1, a first node 100 transmits a first physical-layer signaling and a first MAC PDU via an air interface, the first MAC PDU comprises a first MAC header and a first MAC SDU; monitors a first HARQ-ACK on each channel in a first channel set in step 102, and the first HARQ-ACK indicates whether the first MAC PDU is correctly decoded;

In embodiment 1, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the air interface comprises an interface for radio signal transmission.

In one embodiment, the radio interface comprises a PC5 interface.

In one embodiment, the air interface comprises a Uu interface.

In one embodiment, the second node is a target receiver of the first MAC PDU.

In one embodiment, the first node and the second node respectively maintain a Packet Data Convergence Protocol (PDCP) entity of the first radio bearer.

In one embodiment, a target receiver of a MAC PDU refers to receiving the MAC PDU via an air interface, and no longer forwarding a MAC SDU carried in the MAC PDU via an air interface.

In one embodiment, a target receiver of a MAC PDU refers to receiving the MAC PDU via an air interface, and no longer forwarding a Radio Link Control (RLC) SDU carried in the MAC PDU via an air interface.

In one embodiment, a target receiver of a MAC PDU refers to receiving the MAC PDU via an air interface, and transferring data carried by the MAC PDU to a PDCP layer.

In one embodiment, a target receiver of a MAC PDU refers to receiving the MAC PDU via an air interface, and transferring data carried by the MAC PDU to a Non-Access Stratum (NAS).

In one embodiment, the number of the continuous HARQ DTXs refers to a number of feedback channels continuously dropped to be transmitted by a second node for a data channel transmitted by the first node, and the feedback channel carries an HARQ-ACK associated with a data channel.

In one embodiment, the number of the continuous HARQ DTXs is the same as a number of physical-layer signalings continuously transmitted by the first node and no associated HARQ-ACK is detected.

In one embodiment, the first node is a UE, the physical-layer signaling comprises Sidelink Control Information (SCI), and the first physical-layer signaling comprises SCI.

In one subembodiment of the above embodiment, a physical-layer channel occupied by the first MAC PDU comprises a Physical Sidelink Shared CHannel (PSSCH).

In one subembodiment of the above embodiment, a transmission channel occupied by the first MAC PDU comprises a SideLink Shared CHannel (SL-SCH).

In one subembodiment of the above embodiment, each channel in the first channel set is a Physical Sidelink Feedback Channel (PSFCH).

In one embodiment, the first node is a base station, the physical-layer signaling comprises Downlink Control Information (DCI), and the first physical-layer signaling comprises DCI.

In one embodiment, the physical-layer signaling comprises at least partial bits in a second identity, and the second ID identifies a target receiver of the first MAC SDU.

In one embodiment, a transmitter of the physical-layer signaling is identified by the second ID.

In one embodiment, the physical-layer signaling comprises at least partial bits in a first ID and at least partial bits in a second ID, and the MAC header comprises at least partial bits in the first ID and at least partial bits in the second ID.

In one embodiment, the number of the continuous HARQ DTXs is the same as a number of PSFCHs that is continuously not transmitted by a second node for the first node, and the second node is a target receiver of the first MAC SDU.

In one embodiment, the first radio bearer is a Data Radio Bearer (DRB).

In one embodiment, the first radio bearer is a Signaling Radio Bearer (SRB).

In one embodiment, the first radio bearer is unrelated to whether the number of the continuous HARQ DTXs reaches the first threshold includes: the number of the continuous HARQ DTXs reaching the first threshold will not result in releasing of the first radio bearer.

In one embodiment, the first radio bearer is unrelated to whether the number of the continuous HARQ DTXs reaches the first threshold includes: whether the number of the continuous HARQ DTXs reaches the first threshold, the first MAC SDU is transmitted on the first radio bearer.

In one embodiment, when Q is 0, the behavior of monitoring a first-type HARQ-ACK on each channel in a first channel set comprises maintaining zero transmit power on each channel in a first channel set.

In one embodiment, when Q is 0, the behavior of monitoring a first-type HARQ-ACK on each channel in a first channel set comprises dropping monitoring an HARQ-ACK in a first channel set.

In one embodiment, when Q is 0, the behavior of monitoring a first-type HARQ-ACK on each channel in a first channel set comprises transmitting a radio signal on at least one channel in a first channel set.

In one embodiment, Q is a positive integer.

In one embodiment, a maximum value of Q is configurable.

In one embodiment, a maximum value of Q does not exceed 64.

In one embodiment, if the first HARQ-ACK is not detected on all channels in the first channel set by the first receiver, the number of the continuous HARQ DTXs is updated from a current value to the current value plus 1.

In one embodiment, when the number of the continuous HARQ DTXs reaches the first threshold, a first MAC entity of the first node transmits a first message to a higher layer of the first node, and the first message indicates that the number of the continuous HARQ DTXs reaches the first threshold.

In one embodiment, the higher layer comprises a Radio Resource Control (RRC) layer.

In one embodiment, the higher layer comprises an RLC layer.

In one embodiment, the higher layer comprises a PDCP layer.

In one embodiment, the first MAC PDU is generated in the first MAC entity.

In one embodiment, the first threshold is configurable.

In one embodiment, the first threshold is a fixed constant.

In one embodiment, the first threshold is a positive integer.

In one embodiment, the first threshold does not exceed a 16th power of 2.

In one embodiment, a result of the behavior of monitoring a first HARQ-ACK on each channel in a first channel set is used by the first node to determine whether to retransmit the first MAC PDU.

In one embodiment, when the number of the continuous HARQ DTXs reaches the first threshold, the Q is Q1; when the number of the continuous HARQ DTXs does not reach the first threshold, Q is Q2; Q1 is not greater than a difference value obtained by subtracting 1 from Q2.

In one embodiment, Q1 is equal to a difference value obtained by Q2 minus 1.

In one embodiment, Q1 is equal to a difference value obtained by Q2 minus 1, and the Q1 channel(s) and the Q2 channel(s) have only one different channel.

In one embodiment, the different channel is a first channel.

In one embodiment, the Q2 channel(s) comprises(comprise) the Q1 channel(s).

In one embodiment, when the number of the continuous HARQ DTXs reaches the first threshold, Q is Q1;
when the number of the continuous HARQ DTXs does not reach the first threshold, Q is Q2; Q1 is equal to a difference value between Q2 minus Q3, Q3 being a positive integer greater than 1.

In one embodiment, the first radio bearer is groupcast, and Q3 is a number of target receivers of the first MAC PDU.

In one embodiment, whether the number of the continuous HARQ DTXs reaches the first threshold is used to determine a first field in the first MAC header and a second field in the first physical-layer signaling, and the first field in the first MAC header and the second field in the first physical-layer signaling indicate a destination of the first MAC PDU.

In one embodiment, the first physical-layer signaling comprises a first stage SCI format and a second stage SCI format.

In one embodiment, the scheduling information comprises at least one of time-domain resources or frequency-domain resources of an occupied physical-layer channel.

In one embodiment, the scheduling information comprises at least one of four of a Modulation and Coding Status (MCS), a Redundancy Version (RV), a New Data Indicator (NDI) or a HARQ process number.

In one embodiment, when the number of the continuous HARQ DTXs does not reach the first threshold, the first field in the first MAC header and the second field in the first physical-layer signaling respectively comprise at least partial bits in a second identity; when the number of the continuous HARQ DTXs reaches the first threshold, the first field in the first MAC header and the second field in the first physical-layer signaling respectively comprise at least partial bits in a third identity.

In one embodiment, the first field in the first MAC header and the second field in the first physical-layer signaling consist the second ID or the third identity.

In one embodiment, whether the number of the continuous HARQ DTXs reaches the first threshold, a third field in the first MAC header and a fourth field in the first physical-layer signaling respectively comprise at least partial bits in a first identity.

In one embodiment, the third field in the first MAC header and the fourth field in the first physical-layer signaling consist the first identity.

In one embodiment, the third field in the first MAC header and the fourth field in the first physical-layer signaling indicates a transmitting source of the first MAC PDU.

In one embodiment, names of the first field and the second field are respectively DST and Destination ID.

In one embodiment, the first field and the second field respectively comprise 8 bits and 16 bits.

In one embodiment, names of the third field and the fourth field are respectively SRC and SourceID.

In one embodiment, the first field and the second field respectively comprise 16 bits and 8 bits.

In one embodiment, the second ID and the third ID indicate two different UEs.

In one embodiment, the first ID indicates the first node.

In one embodiment, the first identity, the second ID and the third ID respectively comprise 24 bits.

In one embodiment, the first identity, the second ID and the third ID respectively identify the first node, the second node and the third node in the present disclosure.

In one embodiment, the first identity, the second ID and the third ID are respectively a link-layer identity; any two of the first ID, the second ID and the third ID are different.

In one embodiment, the scheduling information comprises a Channel Status Information (CSI) request.

In one embodiment, the first physical-layer signaling comprises SCI format 0-2.

Embodiment 2

Figure 2:
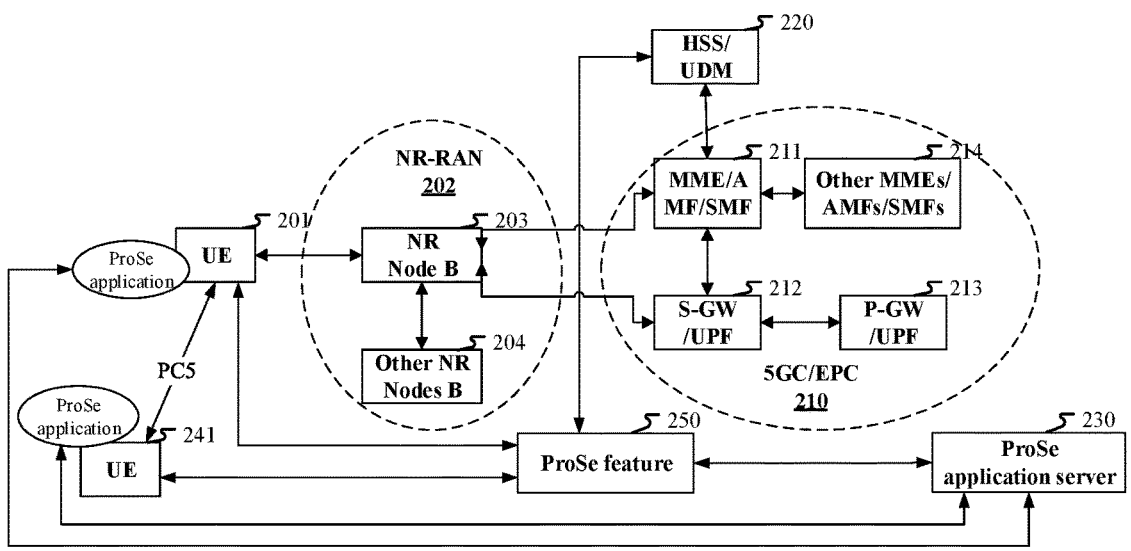
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an SUNG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected via a PC5 Reference Point.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PC1 Reference Point.

In one embodiment, the first node, the second node and the third node in the present disclosure are respectively NR node B, UE 201 and UE 241.

In one embodiment, a first node and a second node in the present disclosure are respectively UE 201 and UE 241.

In one embodiment, a first node and a third node in the present disclosure are respectively UE 201 and UE 241.

In one embodiment, a second node and a third node in the present disclosure are respectively UE 201 and UE 241.

In one embodiment, a wireless link between the UE 201 and the UE 241 corresponds to a sidelink in the present disclosure.

In one embodiment, a wireless link from the UE 201 to NR node B is an uplink.

In one embodiment, a wireless link from NR node B to UE 201 is a downlink.

In one embodiment, the UE 201 supports relay transmission.

In one embodiment, the UE 241 supports relay transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite equipment.

Embodiment 3

Figure 3:
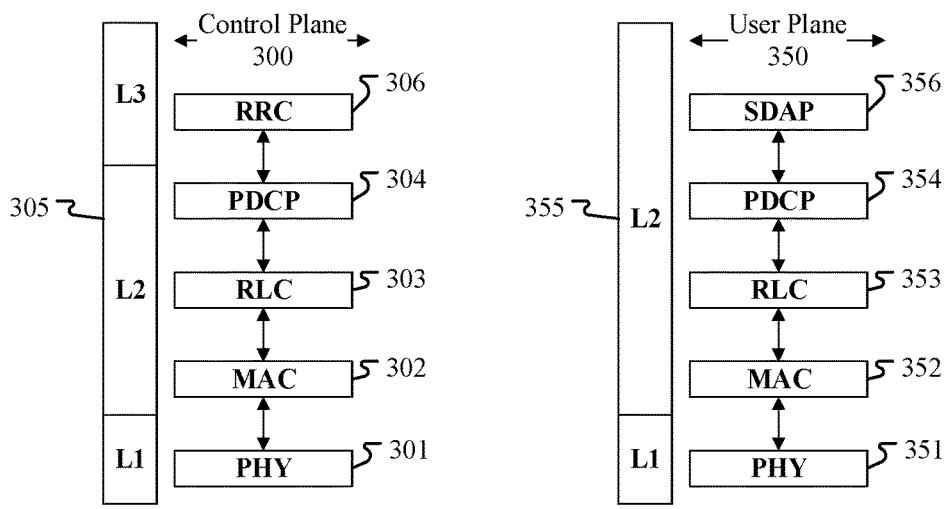
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node and a second node, or between a first node and a third node, or between a second node and a third node or between two UEs is represented by three layers, which are respectively layer 1, layer 2 and layer 3. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, or between the first node and the third node, or between two UEs via the PHY 301. The L2 305 comprises a Medium Access Control (MAC) sublayer 302, an RLC sublayer 303 and a Packet Data Convergence Protocol (PDCP) sublayer 304. All the three sublayers terminate at the second nodes (or third nodes). The PDCP sublayer 304 provides data encryption and integrity protection; for a Uu interface, the PDCP sublayer 304 also provides handover support. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. For a Uu interface, the MAC sublayer 302 is also responsible for allocating between first nodes various radio resources (i.e., resource block) in a cell. The MAC sublayer 302 is also responsible for Hybrid Automatic Repeat Request (HARQ) operation. The RRC sublayer 306 in layer 3 in the control plane 300 is responsible for acquiring radio resources (i.e., radio bearer) and configuring the lower layer using an RRC signaling. The radio protocol architecture in the user plane 350 comprises the L1 layer and the L2 layer. In the user plane 350, the radio protocol architecture used for first node and the second node (the third node) in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, entities of multiple sublayers of the control plane in FIG. 3 form a Signaling Radio Bear (SRB) in the vertical direction.

In one embodiment, entities of multiple sublayers of the control plane in FIG. 3 form a Data Radio Bear (DRB) in the vertical direction.

In one embodiment, the first message in the present disclosure is generated by the MAC 302.

In one embodiment, the first message in the present disclosure is generated by the MAC 352.

In one embodiment, the second message in the present disclosure is generated by the RRC 306.

In one embodiment, the first PHY signaling in the present disclosure is generated by the PHY 301 or the PHY 351.

In one embodiment, the PHY signaling in the present disclosure is generated by the PHY 301 or the PHY 351.

In one embodiment, the first MAC PDU in the present disclosure is generated by the MAC 352 or the MAC 302.

In one embodiment, the first MAC PDU and the fourth MAC PDU in the present disclosure are generated by a same MAC entity.

In one embodiment, the third MAC PDU in the present disclosure is generated by the MAC 352 or the MAC 302.

In one embodiment, the first RLC PDU in the present disclosure is generated by the RLC 303.

In one embodiment, the fifth MAC PDU in the present disclosure is generated by the MAC 302.

In one embodiment, the L2 layer 305 or 355 belongs to a higher layer.

In one embodiment, the L3 layer RRC sublayer 306 belongs to a higher layer.

In one embodiment, a data plane between the first node in the present disclosure and the third node in the present disclosure only needs to maintain a connection between the PHY layer and the MAC sublayer.

In one embodiment, a data plane between the second node in the present disclosure and the third node in the present disclosure only needs to maintain a connection between the PHY layer and the MAC sublayer.

In one embodiment, a data plane between the first node in the present disclosure and the third node in the present disclosure only needs to maintain a connection among the PHY layer, the MAC sublayer and the RLC sublayer.

In one embodiment, a data plane between the second node in the present disclosure and the third node in the present disclosure only needs to maintain a connection among the PHY layer, the MAC sublayer and the RLC sublayer.

In one embodiment, the first node in the present disclosure and the third node in the present disclosure do not need to maintain a connection of the control plane.

In one embodiment, the second node in the present disclosure and the third node in the present disclosure do not need to maintain a connection of the control plane.

Some of the above embodiments avoid the increase of signaling overhead brought by the third node establishing/maintaining higher-layer connections; further, the above embodiments can realize the operation of quick relay joining and exiting of the third node, which reduces delay and improves transmission robustness.

Embodiment 4

Figure 4:
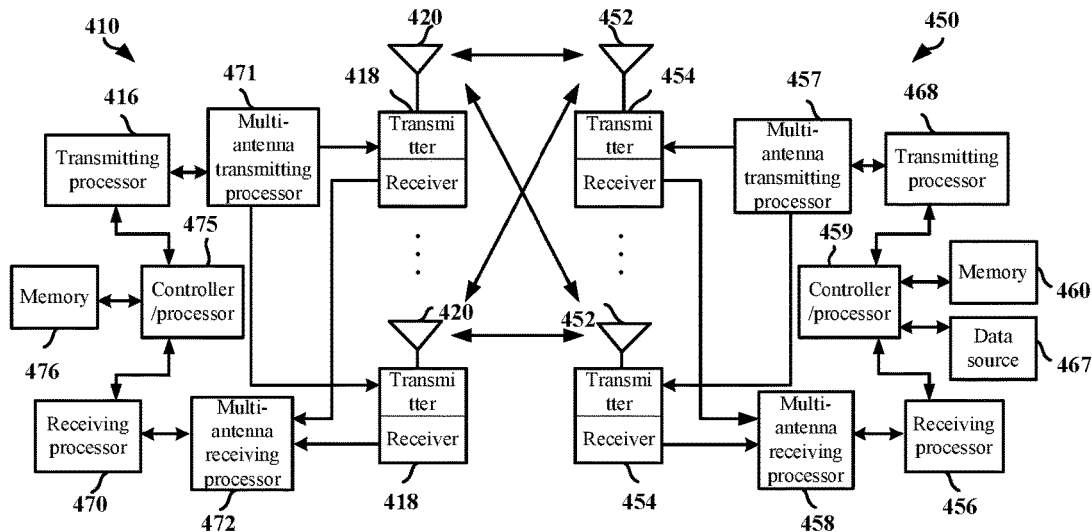
FIG. 4 illustrates a schematic diagram of hardware modules of a communication node according to one embodiment of the present disclosure.

Embodiment 4 illustrates a schematic diagram of hardware modules of a communication node according to one embodiment of the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second node 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least transmits a first physical-layer signaling and a first MAC PDU via an air interface, the first MAC PDU comprises a first MAC header and a first MAC SDU; monitors a first HARQ-ACK on each channel in a first channel set, the first HARQ-ACK indicates whether the first MAC PDU is correctly decoded; herein, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of continuous HARQ DTXs reaches the first threshold.

In one embodiment, the first communication device 450 comprises at least one processor and at least one memory. a memory that stores a computer readable instruction program. The computer readable instruction program generates an action when executed by at least one processor. The action includes: transmitting a first physical-layer signaling and a first MAC PDU via an air interface, the first MAC PDU comprising a first MAC header and a first MAC SDU; monitoring a first HARQ-ACK on each channel in a first channel set, the first HARQ-ACK indicating whether the first MAC PDU is correctly decoded; herein, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first physical-layer signaling via an air interface, detects a first MAC PDU via an air interface, the first MAC PDU comprises a first MAC header and a first MAC SDU; transmits a first HARQ-ACK on a first channel in a first channel set, or, drops transmitting a first HARQ-ACK; herein, the first channel set comprises Q channel(s), Q being a non-negative integer; whether the first HARQ-ACK is transmitted is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second communication device 410 comprises a memory that stores a computer readable instruction program. The computer readable instruction program generates an action when executed by at least one processor. The action includes: receiving a first physical-layer signaling via an air interface, detecting a first MAC PDU via an air interface, the first MAC PDU comprising a first MAC header and a first MAC SDU; transmitting a first HARQ-ACK on a first channel in a first channel set, or, dropping transmitting a first HARQ-ACK; herein, the first channel set comprises Q channel(s), Q being a non-negative integer; whether the first HARQ-ACK is transmitted is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first physical-layer signaling via an air interface, detects a first MAC PDU via an air interface, the first MAC PDU comprises a first MAC header and a first MAC SDU; monitors a first HARQ-ACK on a first channel in a first channel set; or, drops monitoring a first HARQ-ACK; transmits a first HARQ-ACK on a channel in a first channel set; herein, the first channel set comprises Q channel(s), Q being a non-negative integer; whether the first HARQ-ACK is monitored is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second communication device 410 comprises a memory that stores a computer readable instruction program. The computer readable instruction program generates an action when executed by at least one processor. The action includes: receiving a first physical-layer signaling via an air interface, detecting a first MAC PDU via an air interface, the first MAC PDU comprising a first MAC header and a first MAC SDU; monitoring a first HARQ-ACK on a first channel in a first channel set; or, dropping monitoring a first HARQ-ACK; transmitting a first HARQ-ACK on a channel in a first channel set; herein, the first channel set comprises Q channel(s), Q being a non-negative integer; whether the first HARQ-ACK is monitored is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the first communication device 450 corresponds to a first node in the present disclosure; and the second communication device 410 corresponds to a second node in the present disclosure.

In one embodiment, the first communication device 450 corresponds to a first node in the present disclosure; and the second communication device 410 corresponds to a third node in the present disclosure.

In one embodiment, the first communication device 450 corresponds to a third node in the present disclosure; and the second communication device 410 corresponds to a second node in the present disclosure.

In one embodiment, the first communication device 450 is a UE.

In one embodiment, the second communication device 410 is a UE.

Embodiment 5

Figure 5:
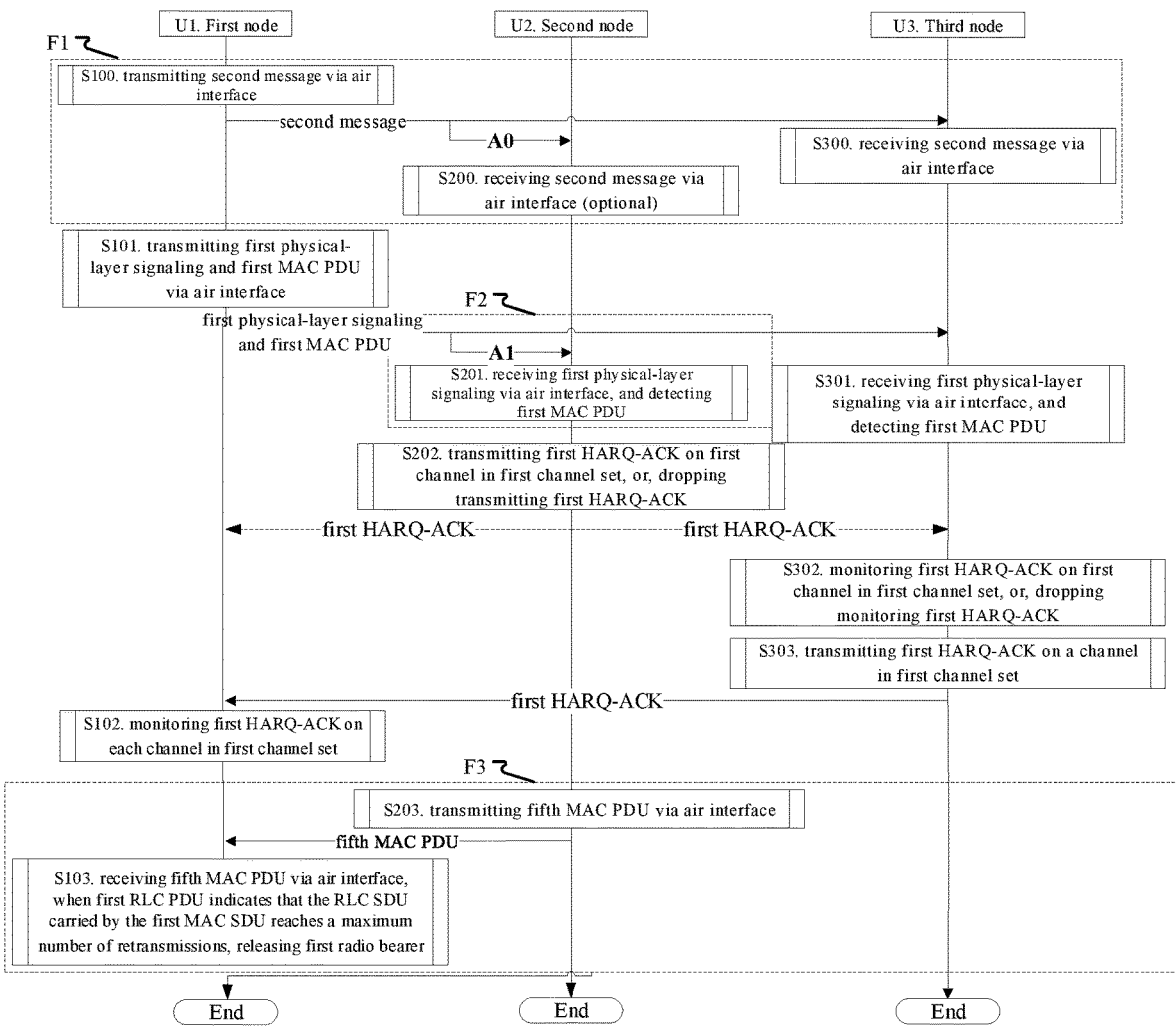
FIG. 5 illustrates a flowchart of transmissions among a first node, a second node and a third node according to one embodiment of the present disclosure.

Embodiment 5 illustrates a flowchart of transmission among a first node, a second node and a third node, as shown in FIG. 5. In FIG. 5, steps in boxes F1, F2 and F3 are respectively optional, where the step S200 in the box marked by F1 is optional.

The first node U1 transmits a second message via an air interface in step S100, the second message is used to determine that the first channel set does not comprise a first channel; transmits a first physical-layer signaling and a first MAC PDU via an air interface in step S101, the first MAC PDU comprises a first MAC header and a first MAC SDU; monitors a first HARQ-ACK on each channel in a first channel set in step S102, the first HARQ-ACK indicates whether the first MAC PDU is correctly decoded; receives a fifth MAC PDU via an air interface in step S103; when a first RLC PDU indicates that the RLC SDU carried by the first MAC SDU reaches a maximum number of retransmissions, releases a first radio bearer.

The second node U2 receives the second message via an air interface in step S200; receives the first physical-layer signaling via an air interface and detects the first MAC PDU in step S201; transmits a first HARQ-ACK on a first channel in a first channel set in step S202, or, drops transmitting a first HARQ-ACK, wherein whether the first HARQ-ACK is transmitted is related to the Q; and transmits a fifth MAC PDU via an air interface in step S203.

The third node U3 receives the second message via an air interface in step S300; receives the first physical-layer signaling via an air interface and detects the first MAC PDU in step S301; monitors a first HARQ-ACK on a first channel in a first channel set in step 302, or, drops monitoring a first HARQ-ACK, wherein whether the first HARQ-ACK is monitored is related to Q; and transmits a first HARQ-ACK on a channel in the first channel set in step 303.

In embodiment 5, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second message received in the step S200 is transmitted directly by the first node U1, as shown in arrow A0.

In one embodiment, the second message received in step S200 is relayed by the third node U3 to the second node U2 after receiving the second message transmitted by the first node U1 in step S300.

In one embodiment, the second message is only transmitted by the first node U1 to the second node U2, that is, the step S200 does not exist.

In one embodiment, the step in the box marked by F1 does not exist; when the number of the continuous HARQ DTXs does not reach the first threshold, a first field in the first MAC header and a second field in the first physical-layer signaling indicate a second ID together; when the number of the continuous HARQ DTXs reaches the first threshold, a first field in the first MAC header and a second field in the first physical-layer signaling indicate a third ID together; the first field in the first MAC header and the second field in the first physical-layer signaling indicates a destination of the first MAC PDU.

In one subembodiment of the above embodiment, only when the number of the continuous HARQ DTXs does not reach the first threshold, steps in the box marked by F2 can be performed, that is, the second node U2 does not receive the first physical layer signaling whose destination are the third identity and the first MAC PDU.

In one embodiment, when the number of the continuous HARQ DTXs does not reach the first threshold, the first channel is reserved for the second node U2; and when the number of the continuous HARQ DTXs reaches the first threshold, the first channel does not comprise the first channel.

In one subembodiment of the above embodiment, the first channel set comprises a second channel, and the second channel is reserved for the third node U3.

In one embodiment, one advantage of the above method is that an HARQ-ACK channel reserved for a relay node and a remote node is fixed, and does not change with whether the number of the continuous HARQ DTXs reaches the first threshold, which improves the robustness.

In one embodiment, when the number of the continuous HARQ DTXs does not reach the first threshold, the second channel is reserved for the third node U3, and the first channel is reserved for the second node U2; when the number of the continuous HARQ DTXs reaches the first threshold, the first channel is reserved for the third node U3, and the first channel set does not comprise the second channel.

In one subembodiment of the above embodiment, according to the definition of the PSFCH in the existing 3GPP Release 16, a time-frequency position of the PSSCH occupied by the first MAC PDU is used to determine time-frequency resources of the first channel.

In one embodiment, one advantage of the above embodiment is that the existing association relation between the PSSCH and the PSFCH can be reused as much as possible, which maintains a good compatibility and reduces the HARQ-ACK feedback delay.

In one embodiment, time-domain resources occupied by the first channel on the second channel are orthogonal.

In one embodiment, the first channel is before the second channel.

In one embodiment, any two of the Q2 channels are reserved for different communication nodes for transmitting the first HARQ-ACK.

In one embodiment, Q is greater than 2, and time-domain resources occupied by any two of the Q channels are orthogonal.

In one embodiment, in a response that the number of the continuous HARQ DTXs reaches the first threshold, the second message is triggered; in a response to receiving the second message, the second node U2 drops transmitting a first HARQ-ACK in step S202.

In one embodiment, when the number of the continuous HARQ DTXs reaches the first threshold, the second message is transmitted by the first node U1.

In one embodiment, the number of the continuous HARQ DTXs is a number of continuous PSFCHs not transmitted by the second node U2 monitored by the first node U1.

In one embodiment, the detecting a first MAC PDU includes channel estimation, channel equalization and channel decoding.

In one embodiment, the detecting a first MAC PDU includes a Cyclic Redundancy Check (CRC); if the CRC is passed, it is considered that the first MAC PDU is correctly decoded; and if the CRC is not passed, it is considered that the first MAC PDU is not correctly decoded.

In one embodiment, the receiving a first physical-layer signaling includes channel estimation, channel equalization and channel decoding.

In one embodiment, the receiving a first physical-layer signaling includes passing a CRC.

In one embodiment, monitoring a first HARQ-ACK on a channel includes determining whether the first HARQ-ACK is transmitted according to energy detection; if the first HARQ-ACK is not transmitted, it is judged to be an HARQ DTX.

In one embodiment, monitoring a first HARQ-ACK on a channel includes determining whether the first HARQ-ACK is transmitted according to characteristic sequence monitoring; if the first HARQ-ACK is not transmitted, it is judged to be an HARQ DTX.

In one embodiment, monitoring a first HARQ-ACK on a channel includes adopting different local sequences to perform characteristic sequence monitoring for ACK and NACK respectively.

In one embodiment, the characteristic sequence monitoring includes a coherent detection.

In one embodiment, the characteristic sequence monitoring includes a non-coherent detection.

In one embodiment, time-frequency resources occupied by the first MAC PDU belong to a resource pool.

In one embodiment, all channels in the first channel set belong to a resource pool.

In one embodiment, the resource pool is allocated to Vehicle to everything (V2X).

In one embodiment, the resource pool is allocated to sidelink.

In one embodiment, time-frequency resources occupied by each channel in the first channel set are pre-defined.

In one embodiment, the first node U1 transmits a higher-layer signaling to time-frequency resources occupied by each channel in the first channel set.

In one embodiment, time-frequency resources occupied by each channel in the first channel set are all associated with time-frequency resources occupied by the first MAC PDU.

In one embodiment, when the Q is greater than 1, all channels in the first channel set occupy same frequency-domain resources, and time-domain resources occupied by any two channels in the first channel set are different.

In one embodiment, an initial sub-channel occupied by a PSSCH of the first MAC PDU is mapped onto any of the same frequency-domain resources.

In one embodiment, the determination method of any of the same frequency-domain resources refers to 3GPP TS38.213, section 16.3.

In one embodiment, when the Q is greater than 1, a slot occupied by a channel closet to time-domain resources of a PSSCH of the first MAC PDU in the first channel set is a first slot, the first slot is a closet slot with a distance not less than a first integer to a last slot occupied by the PSSCH of the first MAC PDU among slots configured as a PSFCH.

In one embodiment, when Q is greater than 1, a slot occupied by Q-1 channel(s) other than the channel closet to time-domain resources of the PSSCH of the first MAC PDU in the first channel set is Q-1 slot(s) closet to the first slot in slots configured as a PSFCH and after the first slot.

In one embodiment, the slot configured as a PSFCH is indicated by a periodPSFCHresource.

In one embodiment, the first integer is indicated by a MinTimeGapPSFCH.

In one embodiment, when Q is greater than 1, a time interval between a slot occupied by Q-1 channel(s) other than the channel closet to time-domain resources of the PSSCH of the first MAC PDU in the first channel set and the first slot is indicated by the first physical-layer signaling.

In one embodiment, when Q is greater than 1, a number of RBs between RB(s) occupied by Q-1 channel(s) other than the channel closest to time-domain resources of the PSSCH of the first MAC PDU in the first channel set and an RB occupied by the channel closest to time-domain resources of the PSSCH of the first MAC PDU in the first channel set is indicated by the first physical-layer signaling.

In one embodiment, Q-1 is 1, and the channel closest to time-domain resources of the PSSCH of the first MAC PDU in the first channel set is the first channel.

In one embodiment, when the number of the continuous HARQ DTXs reaches the first threshold, the Q is Q1; when the number of the continuous HARQ DTXs does not reach the first threshold, Q is Q2; Q1 is not greater than a difference value obtained by subtracting 1 from Q2.

In one embodiment, the number of the continuous HARQ DTXs does not reach the first threshold, the third node U3 monitors the first HARQ-ACK on the first channel in the first channel set and the detected first HARQ-ACK is an ACK; whether the third node correctly decodes the first MAC PDU or not, the first HARQ-ACK transmitted by the third node on the channel in the first channel set is an ACK.

In one embodiment, advantages of the above embodiment include: the first node U1 misses an ACK transmitted by the second node U2, and the first node U1 retransmits the first MAC PDU can be avoided according to an ACK transmitted by the third node, which greatly reduces retransmission times of HARQ.

In one embodiment, the first node U1 receives a fifth MAC PDU via an air interface in step S103, the fifth MAC PDU comprising a first RLC PDU; when the first RLC PDU indicates that the RLC SDU carried by the first MAC SDU reaches a maximum number of retransmissions, releases the first radio bearer; herein, the first RLC PDU indicates whether an RLC SDU carried by the first MAC SDU is received.

In one embodiment, the second node U2 transmits a fifth MAC PDU via an air interface in step S203, and the fifth MAC PDU comprises a first RLC PCU; herein, the first RLC PDU indicates whether an RLC SDU carried by the first MAC SDU is received.

In one embodiment, the first MAC PDU comprises at least partial bits in a first ID and at least partial bits in a second identity.

In one embodiment, when the number of the continuous HARQ DTXs does not reach the first threshold, the fifth MAC PDU comprises at least partial bits in a first ID and at least partial bits in a second identity; when the number of the continuous HARQ DTXs does not reach the first threshold, the fifth MAC PDU comprises at least partial bits in a first ID and at least partial bits in a second identity.

In one embodiment, when the number of the continuous HARQ DTXs does not reach the first threshold, the second message indicates that the fifth MAC PDU comprises at least partial bits in a first ID and at least partial bits in a third ID.

In one embodiment, the first ID, the second ID and the third ID are respectively a link-layer ID.

In one embodiment, the first channel set comprises a channel reserved for a third node, and the third node is identified by the third identity.

In one embodiment, the first RLC PDU is a PDU controlled by an RLC.

In one embodiment, the first RLC PDU is a STATUS PDU.

In one embodiment, the second information comprises an RRCReconfigurationSidelink Information Element (IE).

Embodiment 6

Figure 6:
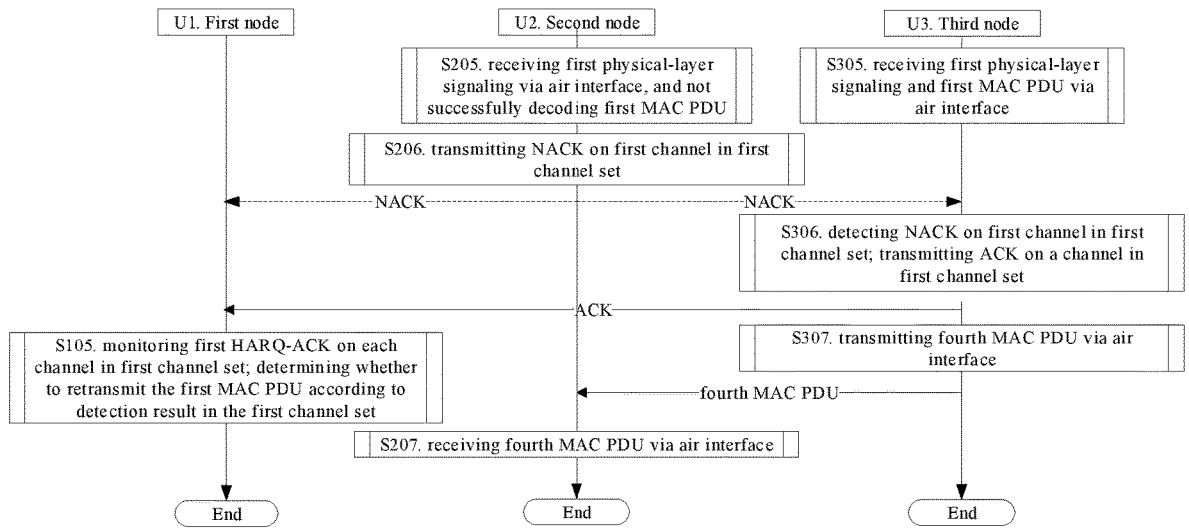
FIG. 6 illustrates a flowchart of retransmission of a first MAC SDU according to one embodiment of the present disclosure.

Embodiment 6 illustrates a flowchart of retransmission of a first MAC SDU according to one embodiment in the present disclosure, as shown in FIG. 6.

The first node U1 monitors a first HARQ-ACK on each channel in a first channel set in step S105, and determines whether the first MAC PDU is retransmitted according to a detection result in the first channel set;
the second node U2 receives the first physical-layer signaling via an air interface in step S205 and does not correctly decode the first MAC PDU; transmits an NACK on a first channel in a first channel set in step S206; and receives a fourth MAC PDU via an air interface in step S207;
the third node U3 receives the first physical-layer signaling and the first MAC PDU via an air interface in step S305; the NACK in detected on the first channel in the first channel set in step 306, and transmits an ACK on a channel in the first channel set; and transmits the fourth MAC PDU via an air interface in step S307;

In embodiment 6, the fourth MAC PDU comprises a fourth MAC header and the first MAC SDU; the number of the continuous HARQ DTXs does not reach the first threshold, Q is greater than 1, and at least one of the Q channels is reserved for the third node U3 to transmit the first HARQ-ACK; the second node U2 is a target receiver of the first MAC PDU, and the third node U3 is not a target receiver of the first MAC PDU.

In one embodiment, a first field and a third field in the fourth MAC header respectively comprise partial bits in a second ID and partial bits in a third ID; the fourth MAC PDU is scheduled by a second physical-layer signaling, the second physical-layer signaling is transmitted by the third node U3 to the second node U2, and a second field and a fourth field in the second physical-layer signaling respectively comprise partial bits in a second ID and partial bits in a third ID.

In one embodiment, when an ACK for the first MAC PDU is detected on any channel in the first channel set, the first node U1 drops a retransmission of the first MAC PDU via an air interface; when no ACK for the first MAC PDU is detected on all channels in the first channel set, the first node U1 retransmits the first MAC PDU via an air interface; herein, the number of the continuous HARQ DTXs does not reach the first threshold, Q is greater than 1, and at least one of the Q channels is reserved for a communication node other than the second node U2 to transmit the first HARQ-ACK.

In one subembodiment of the above embodiment, the third node U3 monitors the first HARQ-ACK on the first channel in the first channel set and the detected first HARQ-ACK is an ACK; whether the third node correctly decodes the first MAC PDU or not, the first HARQ-ACK transmitted by the third node on the channel in the first channel set is an ACK.

In one embodiment, when an ACK for the first MAC PDU is detected on the first channel in the first channel set, the first node U1 drops a retransmission of the first MAC PDU via an air interface; and when no ACK for the first MAC PDU is detected on the first channel in the first channel set, the first node U1 retransmits the first MAC PDU via an air interface; herein, the number of the continuous HARQ DTXs does not reach the first threshold, Q is greater than 1, and at least one of the Q channels is reserved for a communication node other than the second node U2 to transmit the first HARQ-ACK.

In one embodiment, when the first MAC PDU is transmitted, the number of the continuous HARQ DTXs does not reach the first threshold, and Q is greater than 1.

In one embodiment, the behavior of dropping a retransmission of the first MAC PDU comprises releasing a buffer occupied by the first MAC PDU.

In one embodiment, the behavior of dropping a retransmission of the first MAC PDU comprises determining whether to retransmit the first MAC SDU by an RLC layer of the first node.

In one embodiment, the phrase of not detecting an ACK for the first MAC PDU comprises not detecting a first HARQ-ACK.

In one embodiment, the phrase of not detecting an ACK for the first MAC PDU comprises detecting an NACK for the first MAC PDU.

In one embodiment, a third field in the first MAC header and a third field in the fourth MAC header are different, and the third field in the first MAC header and the third field in the fourth MAC header are respectively used to indicate the first node U1 and the third node U3.

Embodiment 7

Figure 7:
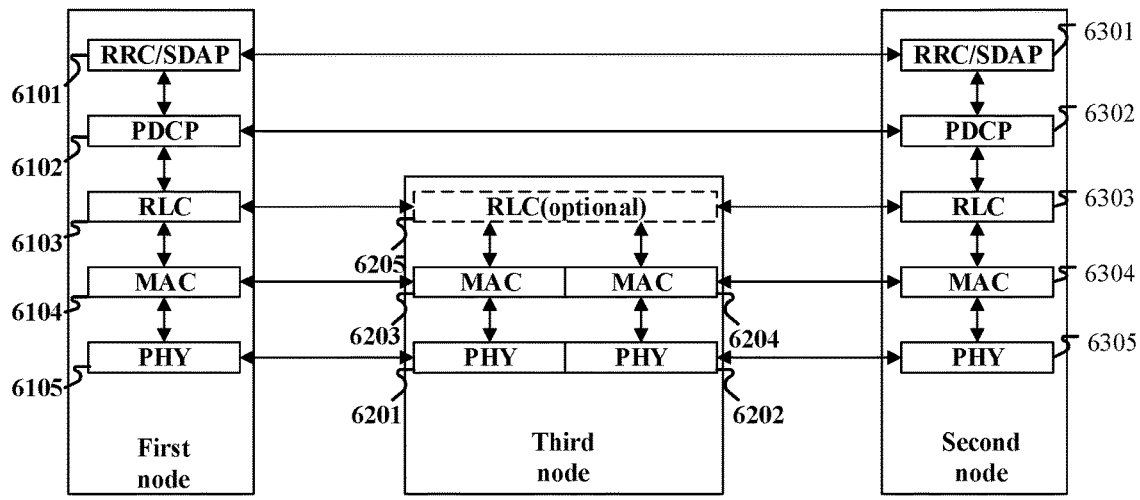
FIG. 7 illustrates a schematic diagram of a protocol architecture of relay transmission according to one embodiment of the present disclosure.

Embodiment 7 illustrates a schematic diagram of a protocol architecture of relay transmission according to one embodiment of the present disclosure, as shown in FIG. 7. In FIG. 7, an RLC sublayer 6205 is optional.

In FIG. 7, in relay transmission, taking data transmitted by a first node to a second node as an example (data transmitted by a second node to a first node in the same way): a first target data is processed by the PDCP sublayer 6102 and the RLC sublayer 6103 on the first node side to generate a first target MAC PDU in the MAC layer 6104, then is transferred to the PHY layer 6105 and is transmitted to the PHY layer

6201 of the third node via an air interface, and then recovers a first RLC data sequentially through the processing of the MAC layer 6203 and the RLC sublayer 6205; the first RLC data is re-combined into a second RLC data (optional) at the RLC sublayer 6205, and then is processed by the MAC sublayer 6204 to generate a second target MAC PDU and is passed to the PHY layer 6202; and then is transmitted to the PHY layer 6305 of the second node via an air interface, then recovers a second target MAC PDU through the MAC 6304, and then recovers a second target data sequentially through the RLC sublayer 6303 and the PDCP sublayer 6302.

In one embodiment, the RLC sublayer 6205 cannot perform data segmentation on the RLC SDU.

In one embodiment, the RLC sublayer 6205 does not modify a Sequence Number (SN) of an RLC SDU generated at the RLC sublayer 6103; for each RLC SDU, an SN recovered at the RLC sublayer 6303 is the same as an SN generated at the RLC sublayer 6103.

In one embodiment, the RLC sublayer 6205 can perform data merging on an RLC SDU.

In one embodiment, the RLC sublayer 6205 does not perform data merging or data segmentation on the RLC SDU, and only performs storage, forwarding and retransmission when necessary; the second RLC data is the same as the first RLC data.

In one embodiment, the first target MAC PDU and the second target MAC PDU are respectively the first MAC PDU and the fourth MAC PDU.

In one embodiment, the first target data is generated at the RRC/SDAP 6101, and the second target data is transmitted to the RRC/SDAP 6301.

In one embodiment, the first target MAC PDU and the second target MAC PDU respectively carry the second message.

In one embodiment, the first radio bearer comprises entities corresponding to the following sublayers: the PDXP 6102, the RLC sublayer 6103, the RLC sublayer 6303 and the PDCP 6302.

In one embodiment, the first radio bearer comprises entities corresponding to the following sublayers: the RRC/SDAP 6101 and the RRC/SDAP 6301.

In one embodiment, the first radio bearer is multiplexed to a MAC entity corresponding to the MAC 6104 and a MAC entity corresponding the MAC 6304.

In one embodiment, a fifth MAC PDU is transmitted by the second node to the first node through a third node.

In one embodiment, the second node transmits a fifth MAC PDU to a third node via an air interface; a third node forwards the fifth MAC PDU to the first node, and the fifth MAC PDU comprises a first RLC PDU; when the first RLC PDU indicates that the RLC SDU carried by the first MAC SDU reaches a maximum number of retransmissions, the first node releases the first radio bearer; herein, the first RLC PDU indicates whether an RLC SDU carried by the first MAC SDU is received.

Embodiment 8

Figure 8:
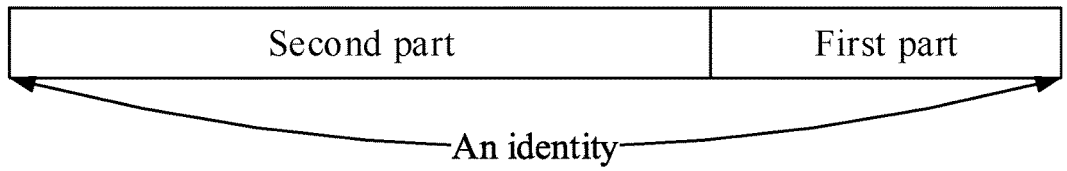
FIG. 8 illustrates a schematic diagram of an ID according to one embodiment of the present disclosure.

Embodiment 8 illustrates a schematic diagram of an ID according to one embodiment of the present application, as shown in FIG. 8.

In Embodiment 8, an ID comprises a first part and a second part.

In one embodiment, a number of bits comprised in the first part and a number of bits comprised in the second part are both positive integral multiple of 8.

In one embodiment, a number of bits comprised in the second part is twice a number of bits comprised in the second part.

In one embodiment, the second part is carried by a MAC PDU, and the first part is carried by a physical-layer signaling.

In one embodiment, a number of bits comprised in the ID is not less than 24.

In one embodiment, the ID is a link layer ID.

In one embodiment, the ID is any of the first ID, the second ID or the third ID.

In one embodiment, the leftmost bit of the ID in FIG. 8 is the MSB, and the rightmost bit is the LSB.

In one embodiment, when the ID is used to identify a destination node, the ID is divided into the first part and the second part.

Embodiment 9

Figure 9:
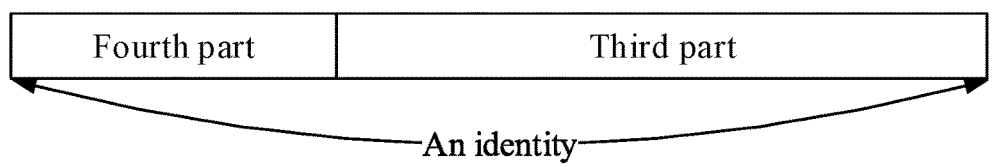
FIG. 9 illustrates another schematic diagram of an ID according to one embodiment of the present disclosure.

Embodiment 9 illustrates another schematic diagram of an identity, as shown in FIG. 9.

In embodiment 9, an ID comprises a third part and a fourth part.

In one embodiment, a number of bits comprised in the third part and a number of bits comprised in the fourth part are both positive integral multiple of 8.

In one embodiment, a number of bits comprised in the third part is twice a number of bits comprised in the fourth part.

In one embodiment, the fourth part is carried by a MAC PDU, and the third part is carried by a physical-layer signaling.

In one embodiment, a number of bits comprised in the ID is not less than 24.

In one embodiment, the ID is a link layer ID.

In one embodiment, the ID is any of the first ID, the second ID or the third ID.

In one embodiment, the leftmost bit of the ID in FIG. 9 is the MSB, and the rightmost bit is the LSB.

In one embodiment, when the ID is used to identify a source node, the ID is divided into the third part and the fourth part.

Embodiment 10

Figure 10:
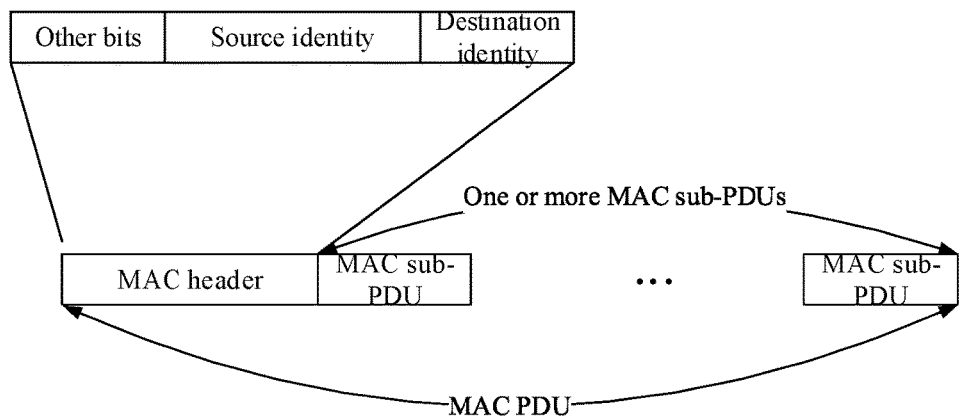
FIG. 10 illustrates a schematic diagram of a MAC PDU according to one embodiment of the present disclosure.

Embodiment 10 illustrates a schematic diagram of a MAC PDU according to one aspect of the present disclosure, as shown in FIG. 10.

In Embodiment 10, a MAC PDU comprises a MAC header and at least one MAC sub-PDU; and the MAC header comprises a source identity, a destination ID and other bits.

In one embodiment, the MAC PDU is transmitted on a SideLink Shared CHannel (SL-SCH).

In one embodiment, a number of bits comprised in the MAC header is fixed.

In one embodiment, a number of bits comprised in the MAC header is 32.

In one embodiment, the MAC header is an SL-SCH MAC subheader.

In one embodiment, the other bits comprise 5 fields, V, R, R, R, and R, and numbers of bits comprised are 4, 1, 1, 1 and 1 respectively.

In one embodiment, the source ID and the destination ID respectively comprise 16 bits and 8 bits.

In one embodiment, the source ID in the MAC header and the destination ID in the MAC header are respectively an SRC field and a DST field.

In one embodiment, each MAC subPDU comprises a MAC subheader and a MAC SDU, a MAC subheader in each MAC subPDU comprises a Logical Channel IDentifier (LCID) field, and the LCID field indicates a channel identifier of a logical channel corresponding to a MAC SDU.

In one embodiment, the LCID field comprises 5 bits.

In one embodiment, the LCID field comprises 6 bits.

In one embodiment, the MAC PDU in FIG. 10 is the first MAC PDU in the present disclosure.

In one subembodiment of the above embodiment, the channel ID of the first logical channel in the present disclosure is an LCID comprised in a MAC sub-header of any MAC sub-PDU in the first MAC PDU.

In one embodiment, the MAC PDU in FIG. 10 is the second MAC PDU in the present disclosure.

In one embodiment, the MAC PDU in FIG. 10 is the target MAC PDU in the present disclosure.

Embodiment 11

Figure 11:
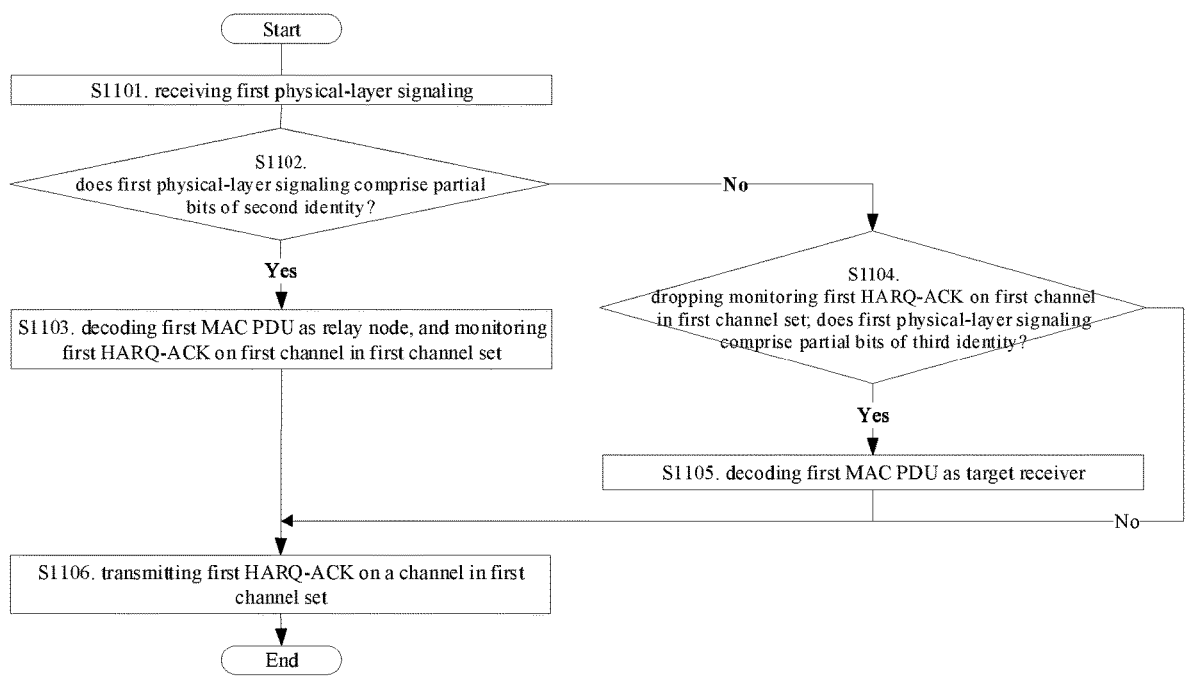
FIG. 11 illustrates a flowchart of judging whether a first HARQ-ACK is monitored on a first channel according to a first physical-layer signaling according to one embodiment of the present disclosure.

Embodiment 11 illustrates a flowchart of judging whether a first HARQ-ACK is monitored on a first channel according to a first physical-layer signaling according to one embodiment of the present disclosure, as shown in FIG. 11. Steps illustrated by FIG. 11 are implemented in a second node.

The second node receives a first physical-layer signaling in step S1101; judges whether partial bits of a second ID are comprised in a first physical-layer signaling in step S1102; if so, decodes a first MAC PDU as a relay node in step S1103, monitors a first HARQ-ACK on a first channel in a first channel set, and then transmits a first HARQ-ACK on a channel in the first channel set in step S1106; if not, drops monitoring the first HARQ-ACK on the first channel in the first channel set in step S1104, and judges whether the first physical-layer signaling comprises partial bits in a third ID, and if so, decodes the first MAC PDU as a target receiver in step S1105; if not, performs the step S1106.

In one embodiment, the above method avoids using second information to inform a second node and a third node whether a number of continuous HARQ DTXs reaches a first threshold, which reduces signaling overhead and improves transmission efficiency.

Embodiment 12

Figure 12:
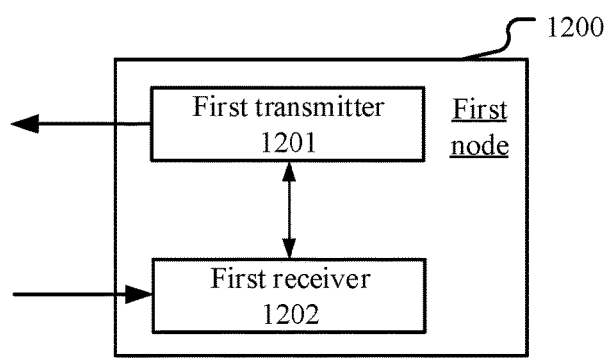
FIG. 12 illustrates a structural block diagram of a processing device in a first node according to one embodiment of the present disclosure.

Embodiment 12 illustrates a structural block diagram of a processing device in a first node according to one embodiment of the present disclosure, as shown in FIG. 12. In FIG. 12, a processing device 1200 in a first node comprises a first transmitter 1201 and a first receiver 1202.

The first transmitter 1201 transmits a first physical-layer signaling and a first MAC PDU via an air interface, the first MAC PDU comprises a first MAC header and a first MAC SDU; a first receiver 1202 monitors a first HARQ-ACK on each channel in a first channel set, and the first HARQ-ACK indicates whether the first MAC PDU is correctly decoded;

In embodiment 12, the first physical-layer signaling comprises scheduling information of the first MAC PDU; the first channel set comprises Q channel(s), Q being a non-negative integer; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, whether the number of the continuous HARQ DTXs reaches the first threshold is used to determine a first field in the first MAC header and a second field in the first physical-layer signaling, and the first field in the first MAC header and the second field in the first physical-layer signaling indicate a destination of the first MAC PDU.

In one embodiment, the first transmitter 1201, when the number of the continuous HARQ DTXs reaches the first threshold, transmits a second message via an air interface; herein, the second message is used to determine that the first channel set does not comprise a first channel.

In one embodiment, when the number of the continuous HARQ DTXs reaches the first threshold, the Q is Q1; when the number of the continuous HARQ DTXs does not reach the first threshold, Q is Q2; Q1 is not greater than a difference value obtained by subtracting 1 from Q2.

In one embodiment, the first receiver 1202, after time-domain resources occupied by the first channel set, receives a second MAC PDU via an air interface, the second MAC PDU comprises a second MAC header and a second MAC SDU; monitors a second HARQ-ACK on each channel in a second channel set, the second HARQ-ACK indicates whether a third MAC PDU is correctly decoded; the first transmitter 1201 transmits a third MAC PDU via an air interface, the third MAC PDU comprises a third MAC header and a third MAC SDU; herein, the number of the continuous HARQ DTXs reaches the first threshold; the second MAC PDU is used to determine that Q2 channel(s) is(are) comprised in the second channel set, and the third MAC PDU is transmitted through the first radio bearer.

In one embodiment, the second MAC PDU is transmitted through the first radio bearer.

In one embodiment, the first radio bearer is a DRB, and the second MAC PDU is transmitted through an SRB.

In one embodiment, the second MAC PDU is transmitted after the second message.

In one embodiment, the first node is characterized in comprising:
the first transmitter 1201 transmits a third message;
herein, the third message is used to determine that the Q2 channel(s) is(are) comprised in the second channel set.

In one embodiment, the first node is characterized in that the first field is comprised in the third MAC header, and the first field in the third MAC header is used to determine that the Q2 channel(s) is(are) comprised in the second channel set.

In one embodiment, the first node is characterized in that the first field is comprised in the third MAC header, when at least partial bits in a third ID are comprised in the first field in the third MAC header, the second channel set comprises the Q2 channel(s); when at least partial bits in a second ID are comprised in the first field in the third MAC header, the Q2 channel(s) is(are) comprised in the second channel set.

In one embodiment, the second MAC PDU is used to trigger the third message.

In one embodiment, the first transmitter 1201, when an ACK for the first MAC PDU is detected on any channel in the first channel set, drops a retransmission of the first MAC PDU via an air interface; when no ACK for the first MAC PDU is detected on all channels in the first channel set, retransmits the first MAC PDU via an air interface; herein, the number of the continuous HARQ DTXs does not reach the first threshold, Q is greater than 1, and at least one of the Q channels is reserved for a communication node other than a target receiver of the first MAC PDU to transmit the first HARQ-ACK.

In one embodiment, the first receiver 1202 receives a fifth MAC PDU via an air interface, the fifth MAC PDU comprises a first RLC PDU; when the first RLC PDU indicates that the RLC SDU carried by the first MAC SDU reaches a maximum number of retransmissions, releases the first radio bearer; herein, the first RLC PDU indicates whether an RLC SDU carried by the first MAC SDU is received.

In one embodiment, the first node 1200 is a UE.

In one embodiment, the first transmitter 1201 comprises at least one of an antenna 452, a transmitter/receiver 454, a multi-antenna transmitting processor 457, a transmitting processor 468, a controller/processor 459, a memory 460, or a data source 467 in FIG. 4 of the present disclosure.

In one embodiment, the first transmitter 1201 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the first receiver 1202 comprises at least the first five of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first four of an antenna 452, a receiver 454, a multi-antenna receiving processor 458, a receiving processor 456, a controller/processor 459, a memory 460 or a data source 467 in FIG. 4 of the present disclosure.

Embodiment 13

Figure 13:
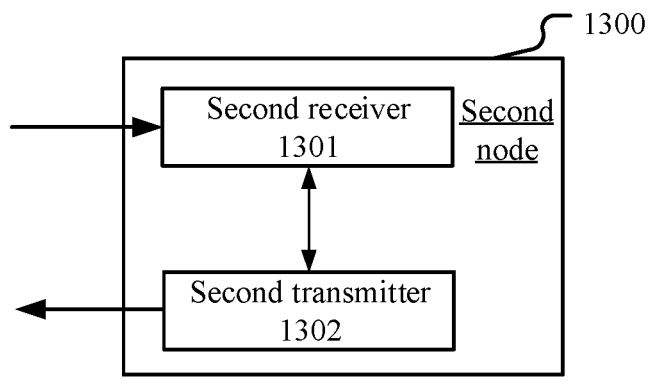
FIG. 13 illustrates a structural block diagram of a processing device in a second node according to one embodiment of the present disclosure.

Embodiment 13 illustrates a structural block diagram of a processing device in a second node according to one embodiment of the present disclosure, as shown in FIG. 13. In FIG. 13, a processing device 1300 in a second node comprises a second receiver 1301 and a second transmitter 1302.

The second receiver 1301 receives a first physical-layer signaling via an air interface, detects a first MAC PDU via an air interface, the first MAC PDU comprises a first MAC header and a first MAC SDU; the second transmitter 1302 transmits a first HARQ-ACK on a first channel in a first channel set, or, drops a transmission of a first HARQ-ACK; herein, the first channel set comprises Q channel(s), Q being a non-negative integer; whether the first HARQ-ACK is transmitted is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, the second receiver 1301 receives second information via an air interface;
  herein, the second message is used to determine that the first channel set does not comprise the first channel, as a response to the number of the continuous HARQ DTXs reaching the first threshold, the second message is triggered; as a response to receiving the second message, the behavior of dropping transmitting a first HARQ-ACK is performed.

In one embodiment, when the number of the continuous HARQ DTXs reaches the first threshold, the Q is Q1; when the number of the continuous HARQ DTXs does not reach the first threshold, Q is Q2; Q1 is not greater than a difference value obtained by subtracting 1 from Q2.

In one embodiment, the second transmitter 1302, after time-domain resources occupied by the first channel set, transmits a second MAC PDU via an air interface, the second MAC PDU comprises a second MAC header and a second MAC SDU; transmits a second HARQ-ACK on a channel in a second channel set, and the second HARQ-ACK indicates whether a third MAC PDU is correctly decoded; the second receiver 1301 receives a third MAC PDU via an air interface, and the third MAC PDU comprises a third MAC header and a third MAC SDU; herein, the number of the continuous HARQ DTXs reaches the first threshold; the second MAC PDU is used to determine that Q2 channel(s) is(are) comprised in the second channel set, and the third MAC PDU is transmitted through the first radio bearer.

In one embodiment, the second receiver 1301 receives a fourth MAC PDU via an air interface, and the fourth MAC PDU comprises a fourth MAC header and the first MAC SDU; herein, the number of the continuous HARQ DTXs does not reach the first threshold, Q is greater than 1, and at least one of the Q channels is reserved for a transmitter of the fourth MAC PDU to transmit the first HARQ-ACK; the second node is a target receiver of the first MAC PDU, and the transmitter of the fourth MAC PDU is not a target receiver of the first MAC PDU; the transmitter of the fourth MAC PDU transmits a first HARQ-ACK in the first channel set, and the first HARQ-ACK indicates that the first MAC PDU is correctly decoded.

In one embodiment, the second transmitter 1302 transmits a fifth MAC PDU via an air interface, and the fifth MAC PDU comprises a first RLC PDU; herein, the first RLC PDU indicates whether an RLC SDU carried by the first MAC SDU is received.

The second receiver 1301 receives a third message;
  herein, the third message is used to determine that the Q2 channel(s) is(are) comprised in the second channel set.

In one embodiment, the second MAC PDU is used to trigger the third message.

In one embodiment, the second node 1300 is a UE.

In one embodiment, the second transmitter 1302 comprises the antenna 420, the transmitter 418, the transmitting processor 416 and the controller/processor 475.

In one embodiment, the second transmitter 1302 comprises the antenna 420, the transmitter 418, the multi-antenna transmitting processor 471, the transmitting processor 416 and the controller/processor 475.

In one embodiment, the second receiver 1301 comprises the antenna 420, the receiver 418, the multi-antenna receiving processor 472, the receiving processor 470 and the controller/processor 475.

In one embodiment, the second receiver 1301 comprises the controller/processor 475.

Embodiment 14

Figure 14:
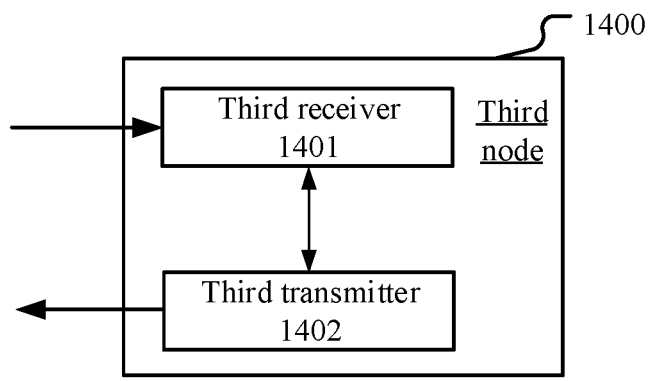
FIG. 14 illustrates a structural block diagram of a processing device in a third node according to one embodiment of the present disclosure.

Embodiment 14 illustrates a structural block diagram of a processing device in a third node according to one embodiment of the present disclosure, as shown in FIG. 14. In FIG. 14, a processing device 1400 in a third node comprises a third receiver 1401 and a third transmitter 1402.

The third receiver 1401 receives a first physical-layer signaling via an air interface, detects a first MAC PDU via an air interface, the first MAC PDU comprises a first MAC header and a first MAC SDU; monitors a first HARQ-ACK on a first channel in a first channel set; or, drops monitoring a first HARQ-ACK; the third transmitter 1402 transmits a first HARQ-ACK on a channel in a first channel set;

in Embodiment 14, the first channel set comprises Q channel(s), Q being a non-negative integer; whether the first HARQ-ACK is monitored is related to Q, the first channel set is reserved for the first HARQ-ACK, and the first HARQ-ACK indicates whether the first MAC PDU is correctly decoded; the first physical-layer signaling comprises scheduling information of the first MAC PDU; whether a number of continuous HARQ DTXs reaches a first threshold is used to determine Q; the first MAC SDU is transmitted through a first radio bearer, and the first radio bearer is unrelated to whether the number of the continuous HARQ DTXs reaches the first threshold.

In one embodiment, at least the former of a second field in the first physical-layer signaling and a first field in the first MAC header is used to determine whether the number of the continuous HARQ DTXs reaches the first threshold, and the first field in the first MAC header and the second field in the first physical-layer signaling indicate a destination of the first MAC PDU.

In one embodiment, the third receiver 1401 receives a second message via an air interface;
  herein, the second message is used to determine that the first channel set does not comprise a first channel, as a response to the number of the continuous HARQ DTXs reaching the first threshold, the second message is triggered.

In one embodiment, when the number of the continuous HARQ DTXs reaches the first threshold, the Q is Q1; when the number of the continuous HARQ DTXs does not reach the first threshold, Q is Q2; Q1 is not greater than a difference value obtained by subtracting 1 from Q2.

In one embodiment, the number of the continuous HARQ DTXs does not reach the first threshold, the third node monitors the first HARQ-ACK on the first channel in the first channel set and the detected first HARQ-ACK is an ACK; whether the third node correctly decodes the first MAC PDU, the first HARQ-ACK transmitted by the third node on the channel in the first channel set is an ACK.

In one embodiment, the third transmitter 1402 transmits a fourth MAC PDU via an air interface, and the fourth MAC PDU comprises a fourth MAC header and the first MAC SDU;
  herein, the number of the continuous HARQ DTXs does not reach the first threshold, Q is greater than 1;
  the third node is not a target receiver of the first MAC PDU; and the third node transmits the first HARQ-ACK on the channel in the first channel set.

In one embodiment, the third receiver 1401 receives a third MAC PDU via an interface, and the third MAC PDU comprises a third MAC header and a third MAC SDU; monitors a second HARQ-ACK on a channel in a second channel set; the third transmitter 1402 transmits a second HARQ-ACK on another channel in the second channel set; herein, the second HARQ-ACK indicates whether a third MAC PDU is correctly decoded, and the number of the continuous HARQ DTXs reaches the first threshold; a second MAC PDU is used to determine that Q2 channel(s) is(are) comprised in the second channel set; the third MAC PDU is transmitted through the first radio bearer; the second MAC PDU is transmitted via an air interface after time-domain resources occupied by the first channel set, the second MAC PDU comprises a second MAC header and a second MAC SDU;
  the third receiver 1401 receives a third message;
  herein, the third message is used to determine that the Q2 channel(s) is(are) comprised in the second channel set.

In one embodiment, the second MAC PDU is used to trigger the third message.

Embodiment 15

Figure 15:
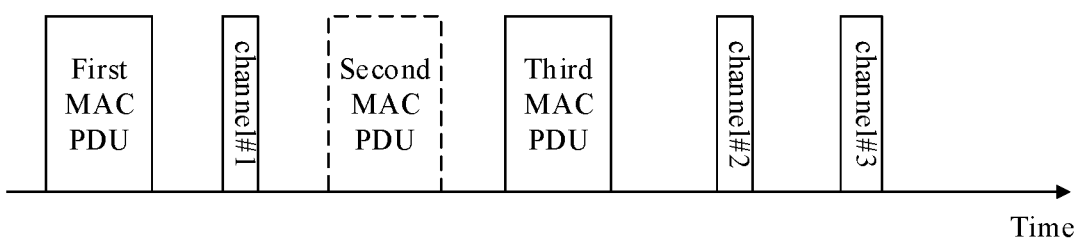
FIG. 15 illustrates a schematic diagram of determining the second channel set according to a second MAC PDU according to one embodiment of the present disclosure.

Embodiment 15 illustrates a schematic diagram of determining the second channel set according to a second MAC PDU according to one embodiment of the present disclosure, as shown in FIG. 15.

In embodiment 15, a first node receives a second MAC PDU via an air interface after time-domain resources occupied by the first channel set, the second MAC PDU comprises a second MAC header and a second MAC SDU; and then transmits a third MAC PDU via an air interface, the third MAC PDU comprises a third MAC header and a third MAC SDU; then monitors a second HARQ-ACK on each channel in a second channel set, and the second HARQ-ACK indicates whether a third MAC PDU is correctly decoded;
  a second node transmits a second MAC PDU via an air interface after time-domain resources occupied by the first channel set, the second MAC PDU comprises a second MAC header and a second MAC SDU; then receives a third MAC PDU via an air interface, the third MAC PDU comprises a third MAC header and a third MAC SDU; then transmits a second HARQ-ACK on a channel in a second channel set, the second HARQ-ACK indicates whether a third MAC PDU is correctly decoded.

In Embodiment 15, the first channel set only comprises channel #1; the number of the continuous HARQ DTXs reaches the first threshold; the second MAC PDU is used by at least the first node out of the first node and the second node to determine that the second channel set comprises two channels, that is, channel #2 and channel #3; and the third MAC PDU is transmitted through the first radio bearer.

In one embodiment, the channel #2 and the channel #3 are reserved for the second node and the third node respectively.

In one embodiment, if the second MAC PDU is not transmitted via an air interface, the second channel set only comprises a channel.

In one embodiment, the channel in the second channel set is the channel #2.

In one embodiment, the channel in the second channel set is the channel #3.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first transmitter configured to:
transmit a first physical-layer signaling and a first Medium Access Control (MAC) Protocol Data Unit (PDU) via an air interface, the first MAC PDU comprising a first MAC header and a first MAC Service Data Unit (SDU);
when an acknowledgement (ACK) value for the first MAC PDU is detected on a channel in a first channel set that includes a reserved channel for a communication node other than a target receiver of the first MAC PDU, drop retransmitting the first MAC PDU via the air interface; and
when no ACK value for the first MAC PDU is detected on all channels in the first channel set, retransmit the first MAC PDU via the air interface; and
a first receiver configured to monitor a first Hybrid Automatic Repeat reQuest Acknowledgment (HARQ-ACK) on each channel in the first channel set, the first HARQ-ACK indicating a first condition of whether the first MAC PDU is correctly decoded,
wherein the first physical-layer signaling comprises scheduling information of the first MAC PDU,
wherein the first channel set comprises Q channels, a value of Q being an integer greater than 1,
wherein a second condition of whether a number of continuous Hybrid Automatic Repeat reQuest Discontinuous Transmissions (HARQ DTXs) reaches a first threshold is used to determine the value of Q,
wherein the first MAC SDU is transmitted through a first radio bearer,
wherein the first radio bearer is unrelated to the second condition of whether the number of the continuous HARQ DTXs reaches the first threshold, and
wherein at least one of the Q channels is reserved for the communication node other than the target receiver of the first MAC PDU to transmit the first HARQ-ACK.

2. The first node according to claim 1, wherein the second condition of whether the number of the continuous HARQ DTXs reaches the first threshold is used to determine a first field in the first MAC header and a second field in the first physical-layer signaling, and the first field in the first MAC header and the second field in the first physical-layer signaling indicate a destination of the first MAC PDU.

3. The first node according to claim 1,
wherein the first transmitter is further configured to, when the number of the continuous HARQ DTXs reaches the first threshold, transmit a second message via the air interface,
wherein the second message is used to determine that the first channel set does not comprise a first channel, and
wherein when the number of the continuous HARQ DTXs does not reach the first threshold, the first channel is reserved for a second node.

4. The first node according to claim 1,
wherein when the number of the continuous HARQ DTXs reaches the first threshold, the value of Q is Q1,
wherein when the number of the continuous HARQ DTXs does not reach the first threshold, the value of Q is Q2,
wherein a value of Q1 is not greater than a difference value obtained by subtracting 1 from a value of Q2, and
wherein the respective values of Q1 and Q2 are integers greater than 1.

5. The first node according to claim 4,
wherein the first receiver is further configured to:
after time-domain resources occupied by the first channel set, receive a second MAC PDU via the air interface, the second MAC PDU comprising a second MAC header and a second MAC SDU; and
monitor a second HARQ-ACK on each channel in a second channel set, the second HARQ-ACK indicating a third condition of whether a third MAC PDU is correctly decoded,
wherein the first transmitter is further configured to transmit the third MAC PDU via the air interface, the third MAC PDU comprising a third MAC header and a third MAC SDU,
wherein the number of the continuous HARQ DTXs reaches the first threshold,
wherein the second MAC PDU is used to determine that Q2 channels are comprised in the second channel set, and
wherein the third MAC PDU is transmitted through the first radio bearer.

6. The first node according to claim 1,
wherein the first receiver is further configured to:
receive a fifth MAC PDU via the air interface, the fifth MAC PDU comprising a first radio link control (RLC) PDU; and
when the first RLC PDU indicates that a RLC SDU carried by the first MAC SDU reaches a maximum number of retransmissions, release the first radio bearer,
wherein the first RLC PDU indicates whether the RLC SDU carried by the first MAC SDU is received.

7. The first node according to claim 1, wherein the first radio bearer is a data radio bearer (DRB), the number of the continuous HARQ DTXs equals a number of physical sidelink feedback channels (PSFCHs) that is continuously not transmitted by a second node for the first node, and the second node is a target receiver of the first MAC SDU.

8. A second node for wireless communications, comprising:
a second receiver configured to:
receive a first physical-layer signaling via an air interface,
detect a first Medium Access Control (MAC) Protocol Data Unit (PDU) via the air interface, the first MAC PDU comprising a first MAC header and a first MAC Service Data Unit (SDU), the second node being a target recipient of the first MAC PDU;
not correctly decode the first MAC PDU; and
receive a fourth MAC PDU through the air interface from a third node that is not the target recipient of the first MAC PDU, wherein the fourth MAC PDU includes the first MAC SDU; and
a second transmitter configured to drop transmitting a first Hybrid Automatic Repeat reQuest Acknowledgment (HARQ-ACK),
wherein a first channel set comprises Q channels, a value of Q being an integer greater than 1, and at least one of the Q channels is reserved for the third node that is not the target recipient of the first MAC PDU to send the first HARQ-ACK, wherein a first condition of whether the first HARQ-ACK is transmitted is related to a value of Q, wherein the first channel set is reserved for the first HARQ-ACK, wherein the first HARQ-ACK indicates whether the first MAC PDU is correctly decoded, wherein the first physical-layer signaling comprises scheduling information of the first MAC PDU, wherein a second condition of whether a number of continuous Hybrid Automatic Repeat reQuest Discontinuous Transmissions (HARQ DTXs) reaches a first threshold is used to determine the value of Q, wherein the first MAC SDU is transmitted through a first radio bearer, and wherein the first radio bearer is unrelated to the second condition of whether the number of the continuous HARQ DTXs reaches the first threshold.

9. The second node according to claim 8, wherein the first radio bearer is a data radio bearer (DRB), the number of the continuous HARQ DTXs equals a number of physical sidelink feedback channels (PSFCHs) that is continuously not transmitted by the second node for the first node, and the second node is a target receiver of the first MAC SDU.

10. The second node according to claim 8, wherein when the number of the continuous HARQ DTXs reaches the first threshold, the value of Q is Q1, wherein when the number of the continuous HARQ DTXs does not reach the first threshold, the value of Q is Q2, wherein a value of Q1 is not greater than a difference value obtained by subtracting 1 from a value of Q2, and wherein the respective values of Q1 and Q2 are integers greater than 1.

11. A third node for wireless communications, comprising:

a third receiver configured to:
  receive a first physical-layer signaling via an air interface;
  detect a first Medium Access Control (MAC) Protocol Data Unit (PDU) via the air interface, the first MAC PDU comprising a first MAC header and a first MAC Service Data Unit (SDU);
  monitor a first Hybrid Automatic Repeat reQuest Acknowledgment (HARQ-ACK) on a first channel in a first channel set; and a third transmitter configured to transmit the first HARQ-ACK on a second channel in the first channel set, wherein the first channel set comprises Q channels, a value of Q being an integer greater than 1, wherein a first condition of whether the first HARQ-ACK is monitored is related to the value of Q, wherein the first channel set is reserved for the first HARQ-ACK, wherein the first HARQ-ACK indicates whether the first MAC PDU is correctly decoded, wherein the first physical-layer signaling comprises scheduling information of the first MAC PDU, wherein a second condition of whether a number of continuous Hybrid Automatic Repeat reQuest Discontinuous Transmissions (HARQ DTXs) HARQ DTXs-reaches a first threshold is used to determine the value of Q, wherein the first MAC SDU is transmitted through a first radio bearer, wherein the first radio bearer is unrelated to the second condition of whether the number of the continuous HARQ DTXs reaches the first threshold, wherein the third node monitors the first HARQ-ACK on the first channel in the first channel set and the detected first HARQ-ACK is an Acknowledgment (ACK) value, and wherein regardless of whether the third node correctly decodes the first MAC PDU, the first HARQ-ACK transmitted by the third node on the second channel in the first channel set is the ACK value.

12. The third node according to claim 11, wherein the first radio bearer is a data radio bearer (DRB), the number of the continuous HARQ DTXs equals a number of physical sidelink feedback channels (PSFCHs) that is continuously not transmitted by a second node for a first node, and the second node is a target receiver of the first MAC SDU.

13. The third node according to claim 11, wherein when the number of the continuous HARQ DTXs reaches the first threshold, the value of Q is Q1, wherein when the number of the continuous HARQ DTXs does not reach the first threshold, the value of Q is Q2, wherein a value of Q1 is not greater than a difference value obtained by subtracting 1 from a value of Q2, and wherein the respective values of Q1 and Q2 are integers greater than 1.

14. A method in a first node for wireless communications, comprising:

transmitting a first physical-layer signaling and a first Medium Access Control (MAC) Protocol Data Unit (PDU) via an air interface, the first MAC PDU comprising a first MAC header and a first MAC Service Data Unit (SDU);

when an acknowledgement (ACK) value for the first MAC PDU is detected on a channel in the first channel set that includes a reserved channel for a communication node other than a target receiver of the first MAC PDU, dropping retransmitting the first MAC PDU via the air interface;

when no ACK value for the first MAC PDU is detected on all channels in the first channel set, retransmitting the first MAC PDU via the air interface; and monitoring a first Hybrid Automatic Repeat reQuest Acknowledgment (HARQ-ACK) on each channel in a first channel set, the first HARQ-ACK indicating a first condition of whether the first MAC PDU is correctly decoded, wherein the first physical-layer signaling comprises scheduling information of the first MAC PDU, wherein the first channel set comprises Q channels, a value of Q being an integer greater than 1, wherein a second condition of whether a number of continuous Hybrid Automatic Repeat reQuest Discontinuous Transmissions (HARQ DTXs) reaches a first threshold is used to determine the value of Q, wherein the first MAC SDU is transmitted through a first radio bearer, and the first radio bearer is unrelated to the second condition of whether the number of the continuous HARQ DTXs reaches the first threshold, and wherein at least one of the Q channels is reserved for the communication node other than the target receiver of the first MAC PDU to transmit the first HARQ-ACK.

15. The method in the first node according to claim 14, further comprising when the number of the continuous HARQ DTXs reaches the first threshold, transmitting a second message via the air interface, wherein the second message is used to determine that the first channel set does not comprise a first channel, and wherein when the number of the continuous HARQ DTXs does not reach the first threshold, the first channel is reserved for a second node.

16. The method in the first node according to claim 14, wherein the first radio bearer is a data radio bearer (DRB), the number of the continuous HARQ DTXs equals a number of physical sidelink feedback channels (PSFCHs) that is continuously not transmitted by a second node for the first node, and the second node is a target receiver of the first MAC SDU.

17. The method in the first node according to claim 15, wherein the first radio bearer is a data radio bearer (DRB), the number of the continuous HARQ DTXs equals a number of physical sidelink feedback channels (PSFCHs) that is continuously not transmitted by the second node for the first node, and the second node is a target receiver of the first MAC SDU.

18. The method in the first node according to claim 14, wherein when the number of the continuous HARQ DTXs reaches the first threshold, the value of Q is Q1, wherein when the number of the continuous HARQ DTXs does not reach the first threshold, the value of Q is Q2, wherein a value of Q1 is not greater than a difference value obtained by subtracting 1 from a value of Q2, and wherein the respective values of Q1 and Q2 are integers greater than 1.

* * * * *